United States Patent
Iwata et al.

(10) Patent No.: US 10,797,345 B2
(45) Date of Patent: Oct. 6, 2020

(54) SULFUR COMPOUND SOLID ELECTROLYTE DISPERSION PASTE FOR SECONDARY BATTERIES, SULFUR COMPOUND SOLID ELECTROLYTE LAYER FOR SECONDARY BATTERIES USING SAME, AND ALL-SOLID-STATE SECONDARY BATTERY USING SAME

(71) Applicants: KANSAI PAINT CO., LTD., Hyogo (JP); TOYOTA JIDOSHA KABUSHIKI KAISHA, Aichi-ken (JP)

(72) Inventors: Naoyuki Iwata, Kanagawa (JP); Atsushi Tsukamoto, Kanagawa (JP); Masakazu Tamaru, Kanagawa (JP); Hiroyuki Yamaguchi, Aichi-ken (JP); Satoshi Yoshida, Aichi-ken (JP); Yuki Ishigaki, Aichi-ken (JP)

(73) Assignees: KANSAI PAINT CO., LTD., Hyogo (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 106 days.

(21) Appl. No.: 16/127,557

(22) Filed: Sep. 11, 2018

(65) Prior Publication Data
US 2019/0081353 A1 Mar. 14, 2019

(30) Foreign Application Priority Data
Sep. 12, 2017 (JP) .................. 2017-174963

(51) Int. Cl.
| | | |
|---|---|---|
| *H01M 10/0565* | (2010.01) | |
| *H01B 1/12* | (2006.01) | |
| *H01B 1/10* | (2006.01) | |
| *H01M 10/056* | (2010.01) | |
| *H01M 10/052* | (2010.01) | |

(52) U.S. Cl.
CPC .......... *H01M 10/0565* (2013.01); *H01B 1/10* (2013.01); *H01B 1/12* (2013.01); *H01M 10/052* (2013.01); *H01M 10/056* (2013.01); *H01M 2300/0028* (2013.01)

(58) Field of Classification Search
CPC .............. H01M 2300/0065; H01M 2300/0028
See application file for complete search history.

(56) References Cited

U.S. PATENT DOCUMENTS

| | | | |
|---|---|---|---|
| 2012/0295159 A1* | 11/2012 | Kobayashi | H01M 4/133 429/211 |
| 2013/0309551 A1* | 11/2013 | Ogasa | H01M 10/0463 429/149 |
| 2014/0004257 A1 | 1/2014 | Kubo et al. | |
| 2018/0076481 A1* | 3/2018 | Makino | C08G 18/71 |
| 2018/0083307 A1* | 3/2018 | Makino | H01M 10/0562 |
| 2019/0006700 A1* | 1/2019 | Makino | H01M 10/052 |
| 2019/0157715 A1* | 5/2019 | Makino | H01M 10/0562 |

FOREIGN PATENT DOCUMENTS

| | | |
|---|---|---|
| JP | 2012-212652 | 11/2012 |
| JP | 2014-241240 | 12/2014 |

OTHER PUBLICATIONS

Grulke, "Solubility Parameter Values", Polymer Handbook, VII, 1989, pp. 519-559.

* cited by examiner

*Primary Examiner* — Matthew J Merkling
(74) *Attorney, Agent, or Firm* — Wenderoth, Lind & Ponack, L.L.P.

(57) ABSTRACT

An object of the present invention is to further lower the viscosity of a sulfur compound solid electrolyte dispersion paste while suppressing sedimentation of a sulfur compound solid electrolyte. Provided is a sulfur compound solid electrolyte dispersion paste for secondary batteries, containing a dispersion resin (A), a sulfur compound solid electrolyte (B) and a solvent (C), wherein the dispersion resin (A) contains at least one type of acrylic resin (a) having a weight-average molecular weight of 3000 or higher.

11 Claims, No Drawings

SULFUR COMPOUND SOLID ELECTROLYTE DISPERSION PASTE FOR SECONDARY BATTERIES, SULFUR COMPOUND SOLID ELECTROLYTE LAYER FOR SECONDARY BATTERIES USING SAME, AND ALL-SOLID-STATE SECONDARY BATTERY USING SAME

TECHNICAL FIELD

The present invention relates to a sulfur compound solid electrolyte dispersion paste for secondary batteries, to a sulfur compound solid electrolyte layer for secondary batteries that utilizes the sulfur compound solid electrolyte dispersion paste, and to an all-solid-state secondary battery that utilizes the sulfur compound solid electrolyte layer.

BACKGROUND ART

Metal ion secondary batteries (for instance lithium ion secondary batteries, hereafter also referred to as "all-solid-state batteries") having a solid electrolyte layer that utilizes a non-flammable solid electrolyte are advantageous in that, for example, a high cycle life can be expected, higher capacity can be achieved, and a system for ensuring safety can easily be simplified.

As a technology relating to lithium ion secondary batteries, for instance PTL 1 discloses a method for producing a sulfide all-solid-state battery that has a positive electrode layer and a negative electrode layer, and a solid electrolyte layer disposed therebetween, the method including: a coating step of forming a coating film on the surface of a base material, as a result of a process of coating the surface of the base material with a paste-like composition produced using a sulfide solid electrolyte, a substance that elicits the effect of increasing a viscosity, and a solvent; a pressing step of pressing the coating film formed on the surface of the base material with an object to be transferred, in a state where the coating film and the object to be transferred are kept in contact with each other; and a transfer step of, after the pressing step, transferring the coating film to the surface of the object to be transferred, by stripping off the base material, wherein the substance that elicits the effect of increasing a viscosity has a main chain being a divalent organic group, and a functional group at either end of the main chain, and the functional group is selected from the group consisting of benzoyloxy groups, benzoyl groups, epoxy groups and primary amino groups.

PTL 2 discloses a slurry that contains a sulfide solid electrolyte material, and a dispersion medium made up of at least one of: a tertiary amine; an ether; a thiol; an ester having a functional group bonded to a carbon atom of an ester group and having 3 or more carbon atoms, and a functional group bonded to an oxygen atom of the ester group and having 4 or more carbon atoms; and an ester having a benzene ring bonded to a carbon atom of an ester group.

However, a pressing demand exists for pastes being dispersions of a sulfide solid electrolyte in a solvent such that not only is sedimentation of the sulfide solid electrolyte suppressed, but also a low-viscosity dispersion paste can be achieved using less solvent (and less dispersant).

CITATION LIST

Patent Literature

PTL 1: Japanese Patent Application Publication No. 2014-241240

PTL 2: Japanese Patent Application Publication No. 2012-212652

SUMMARY OF INVENTION

Technical Problem

It is an object of the present invention to further lower the viscosity of a sulfur compound solid electrolyte dispersion paste (i.e. achieving a high-solids content) while suppressing sedimentation of a sulfur compound solid electrolyte.

Solution to Problem

As a result of diligent research conducted in the light of the above considerations, the inventors found that the above goal can be achieved by using a resin containing at least one type of acrylic resin (a), as a dispersion resin of a sulfur compound solid electrolyte in a sulfur compound solid electrolyte dispersion paste for secondary batteries. The inventors arrived at the present invention on the basis of that finding.

In the present invention there is accordingly provided an invention having the following features.

1. A sulfur compound solid electrolyte dispersion paste for secondary batteries, containing a dispersion resin (A), a sulfur compound solid electrolyte (B) and a solvent (C), wherein the dispersion resin (A) contains at least one type of acrylic resin (a) having a weight-average molecular weight of 3000 or higher.

2. The sulfur compound solid electrolyte dispersion paste for secondary batteries in 1, containing 0.01 to 10 mass % of the dispersion resin (A) with respect to the solids mass of the sulfur compound solid electrolyte dispersion paste.

3. The sulfur compound solid electrolyte dispersion paste for secondary batteries in 1 or 2, wherein the acrylic resin (a) is a copolymer of starting monomers including 20 to 99 mass % of a polymerizable unsaturated monomer (a1) having an alkyl group with 4 or more carbon atoms, 0 to 50 mass % of a polymerizable unsaturated monomer (a2) having an alkyl group with fewer than 4 carbon atoms, and 1 to 30 mass % of a polymerizable unsaturated monomer (a3) having a functional group.

4. The sulfur compound solid electrolyte dispersion paste for secondary batteries in any one of 1 to 3, wherein the acrylic resin (a) contains, as a polymerizable unsaturated monomer (a3) having a functional group, a high-polarity polymerizable unsaturated monomer (a3-1) having at least one type of highly polar functional group selected from the group consisting of carboxyl groups, phosphoric acid groups, sulfonic acid groups, amino groups, quaternary bases, amide groups, hydroxyl groups, polyalkylene glycol groups and alkoxy groups.

5. The sulfur compound solid electrolyte dispersion paste for secondary batteries in any one of 1 to 3, wherein the acrylic resin (a) contains a high-polarity polymerizable unsaturated monomer (a2-1) having a solubility parameter of 9 $(J/mol)^{1/2}$ or higher, as a polymerizable unsaturated monomer (a2) having an alkyl group with fewer than 4 carbon atoms.

6. The sulfur compound solid electrolyte dispersion paste for secondary batteries in any one of 1 to 5, wherein a solubility parameter of the acrylic resin (a) is lower than 9 $(J/mol)^{1/2}$.

7. The sulfur compound solid electrolyte dispersion paste for secondary batteries in any one of 1 to 6, wherein the solvent (C) is an ester-based solvent represented by Formula (1) below, and/or a hydrocarbon-based solvent $$R^1COOR^2 \quad (1)$$

(in the formula, $R^1$ and $R^2$ may be identical or different, and each represents a hydrocarbon having 2 or more carbon atoms).

8. The sulfur compound solid electrolyte dispersion paste for secondary batteries in any one of 1 to 7, wherein a solubility parameter of the solvent (C) is 7.3 to 8.5 $(J/mol)^{1/2}$.

9. The sulfur compound solid electrolyte dispersion paste for secondary batteries in any one of 1 to 8, further containing a binder (D).

10. A sulfur compound solid electrolyte layer for secondary batteries, which is a dried product of the sulfur compound solid electrolyte dispersion paste for secondary batteries in any one of 1 to 9 above.

11. A sulfur compound solid electrolyte layer for secondary batteries, containing a dispersion resin (A), a sulfur compound solid electrolyte (B), and optionally a binder (D), wherein the dispersion resin (A) contains at least one type of acrylic resin (a) having a weight-average molecular weight of 3000 or higher.

12. An all-solid-state secondary battery, provided with the sulfur compound solid electrolyte layer of 10 or 11, a positive electrode and a negative electrode.

Advantageous Effects of Invention

The present invention succeeds in providing a sulfur compound solid electrolyte dispersion paste for secondary batteries in which viscosity is lowered (or solids are increased) while suppressing sedimentation of a sulfur compound solid electrolyte.

DESCRIPTION OF EMBODIMENTS

Unless conflicting matter is otherwise explicitly mentioned in the disclosure of the present specification, the feature "the resin contains a monomer X as a starting material thereof" signifies that the resin is a (co)polymer of starting monomers including the monomer X. The language (co)polymer in the present specification denotes a polymer or a copolymer.

In the present specification, the language "(meth)acrylate" denotes acrylate and/or methacrylate, and "(meth)acrylic acid" denotes acrylic acid and/or methacrylic acid. Further, the language "(meth)acryloyl" denotes acryloyl and/or methacryloyl, and "(meth)acrylamide" denotes acrylamide and/or methacrylamide.

1. Sulfur Compound Solid Electrolyte Dispersion Paste for Secondary Batteries

The present invention provides a sulfur compound solid electrolyte dispersion paste for secondary batteries, the paste containing a dispersion resin (A), a sulfur compound solid electrolyte (B) and a solvent (C), wherein the dispersion resin (A) contains at least one type of an acrylic resin (a) having a weight-average molecular weight of 3000 or higher.

Dispersion Resin (A)

As a characterizing feature, the dispersion resin (A) that can be used in the sulfur compound solid electrolyte dispersion paste for secondary batteries of the present invention contains at least one type of acrylic resin (a) having a weight-average molecular weight of 3000 or higher. The dispersion resin (A) can contain conventionally known resins, as needed, along with the acrylic resin (a). Specific examples include for instance polyester resins, epoxy resins, urethane resins, polyether resins, fluororesins, silicone resins, polycarbonate resins, melamine resins, chlorine-based resins, fluorine-based resins, cellulose resins, polyvinyl alcohol resins, polybutadiene rubbers and the like, as well as modified resins and composite resins of the foregoing. These resins can be incorporated as one type singly or as a combination of two or more types, along with the acrylic resin (a).

As regards the content of the dispersion resin (A) contained in the sulfur compound solid electrolyte dispersion paste of the present invention, the solids mass of the dispersion resin (A) is preferably 0.01 to 10 mass %, more preferably 0.05 to 5 mass % and particularly preferably 0.1 to 2 mass %, with respect to the solids mass of the solid electrolyte dispersion paste.

Acrylic Resin (a)

The acrylic resin (a) that can be used in the present invention is a copolymer containing ordinarily 50% or more, preferably 70% or more, of a (meth)acryloyl group-containing monomer. Known monomers can be used, without limitations, as polymerizable unsaturated monomers other than the (meth)acryloyl group-containing monomer. Specific examples include for instance styrene, α-methyl styrene, vinyl toluene, (meth)acrylonitrile and the like. The content of the foregoing can be ordinarily lower than 50%, preferably lower than 30%.

The acrylic resin (a), which is obtained through copolymerization of polymerizable unsaturated monomers, is a polymer not having an unsaturated hydrocarbon skeleton in a main chain and being made up of repeating units represented by Formula (i).

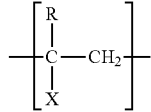

Formula (i)

(In the formula, X is an organic group having at least one carbon; and R is a methyl group or a hydrogen atom.)

From the viewpoint of resin polarity, the acrylic resin (a) is preferably a copolymer of starting monomers including 20 to 99 mass % of a polymerizable unsaturated monomer (a1) having an alkyl group with 4 or more carbon atoms, 0 to 50 mass % of a polymerizable unsaturated monomer (a2) having an alkyl group with fewer than 4 carbon atoms, and 1 to 30 mass % of a polymerizable unsaturated monomer (a3) having a functional group.

Likewise from the viewpoint of resin polarity, a solubility parameter of the acrylic resin (a) is preferably lower than 9 $(J/mol)^{1/2}$, more preferably lower than 8.5 $(J/mol)^{1/2}$.

The term solubility parameter, generally also referred to as SP-value (solubility parameter), is a yardstick denoting the degree of hydrophilicity or hydrophobicity (polarity) of a solvent or of a resin. The solubility parameter is an important yardstick in terms of determining solubility between a solvent and a resin, and between resins, in that solubility parameter values that are close to each other (small absolute value of the difference between solubility parameters) are ordinarily indicative of good solubility and/or compatibility.

The solubility parameter of a solvent can be determined in accordance with the method described in "Polymer Handbook" VII Solubility Parameter Values, pp 519-559 (John Wiley & Sons, 3rd edition 1989, edited by J. Brandrup, E. H. Immergut). In a case where two or more solvents are used in combination, in the form of a mixed solvent, the solubility parameters can be worked out experimentally, and as a simple method, there can be worked out the sum of the products of the solubility parameters and the molar fractions of the individual liquid solvents.

The solubility parameter of a resin is numerically quantified on the basis of a turbidity measurement method that is known to a person skilled in the art. Specifically, the solubility parameter can be worked out in accordance with the expression by K. W. Suh and J. M. Corbett (Journal of Applied Polymer Science, 12, 2359, 1968).

The acrylic resin (a) in the present invention contains a high proportion of low-polarity monomers, and has a low value of solubility parameter (low polarity), which accordingly is found to translate into higher solubility and compatibility of the solvent (C) and binder (D), and in increased storage stability.

Polymerizable Unsaturated Monomer (a1) Having an Alkyl Group with 4 or More Carbon Atoms As the polymerizable unsaturated monomer (a1) having an alkyl group with 4 or more carbon atoms there can be used a polymerizable unsaturated monomer having an alkyl group with 4 or more carbon atoms, without particular limitations, so long as the monomer is a polymerizable unsaturated monomer other than a below-described polymerizable unsaturated monomer (a3) having a functional group. Specific examples include for instance linear, branched and cyclic alkyl group-containing (meth)acrylates such as n-butyl (meth)acrylate, isobutyl (meth)acrylate, tert-butyl (meth)acrylate, 2-ethylhexyl (meth)acrylate, n-octyl (meth)acrylate, lauryl (meth)acrylate, stearyl (meth)acrylate, isostearyl acrylate, cyclohexyl (meth)acrylate, isobornyl (meth)acrylate, tridecyl (meth)acrylate and the like. The foregoing can be used singly or in the form of combinations of two or more types.

The sulfur compound solid electrolyte dispersion paste obtained through dispersion by acrylic resin (a) having the above monomer (a1) as a constituent component allows enhancing viscosity and storage stability.

Polymerizable Unsaturated Monomer (a2) Having an Alkyl Group with Fewer than 4 Carbon Atoms As the polymerizable unsaturated monomer (a2) having an alkyl group with fewer than 4 carbon atoms there can be used, without particular limitations, a polymerizable unsaturated monomer having an alkyl group with fewer than 4 carbon atoms, so long as the monomer is other than the below-described polymerizable unsaturated monomer (a3) having a functional group. Specifically there can be used for instance alkyl (meth)acrylates having three or fewer carbon atoms, for instance methyl (meth)acrylate, ethyl (meth)acrylate, n-propyl (meth)acrylate, isopropyl (meth)acrylate and the like. The foregoing can be used singly or in the form of combinations of two or more types.

As the polymerizable unsaturated monomer (a2) having an alkyl group with fewer than 4 carbon atoms there is incorporated preferably a high-polarity polymerizable unsaturated monomer (a2-1) having a solubility parameter of 9 $(J/mol)^{1/2}$ or higher, specifically for instance methyl acrylate (SP: 9.38) or methyl methacrylate (SP: 9.23).

Polymerizable Unsaturated Monomer (a3) Having a Functional Group

The polymerizable unsaturated monomer (a3) having a functional group is a polymerizable unsaturated monomer that has a functional group other than an alkyl group. Specific examples thereof include for instance hydroxyl group-containing polymerizable unsaturated monomers such as monoesters of (meth)acrylic acid and a dihydric alcohol having 2 to 8 carbon atoms, for instance 2-hydroxyethyl (meth)acrylate, 2-hydroxypropyl (meth)acrylate, 3-hydroxypropyl (meth)acrylate, 4-hydroxybutyl (meth)acrylate and the like; ε-caprolactone-modified products of monoesters of a (meth)acrylic acid and a dihydric alcohol having 2 to 8 carbon atoms; N-hydroxymethyl (meth)acrylamide; allyl alcohols; and (meth)acrylates having a polyoxyalkylene chain the molecular ends of which are hydroxyl groups; carboxyl group-containing polymerizable unsaturated monomers such as (meth)acrylic acid, maleic acid, crotonic acid, β-carboxyethyl acrylate and the like; nitrogen-containing polymerizable unsaturated monomers that do not contain urethane bonds, such as (meth)acrylonitrile, dimethyl acrylamide, (meth)acrylamide, N,N-dimethylaminoethyl (meth)acrylate, N,N-diethylaminoethyl (meth)acrylate, N,N-dimethylaminopropyl (meth)acrylamide, as well as adducts of glycidyl (meth)acrylate and amines; polymerizable unsaturated monomers having urethane bonds, such as reaction products of an isocyanate group-containing polymerizable unsaturated monomer and a hydroxyl group-containing compound, and reaction products of a hydroxyl group-containing polymerizable unsaturated monomer and an isocyanate group-containing compound; epoxy group-containing polymerizable unsaturated monomers such as glycidyl (meth)acrylate, β-methyl glycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate, allyl glycidyl ether and the like; (meth)acrylates having a polyoxyethylene chain the molecular ends of which are alkoxy groups; polymerizable unsaturated monomers having sulfonic acid groups, such as 2-acrylamide-2-methylpropanesulfonic acid, 2-sulfoethyl (meth)acrylate, allylsulfonic acid and 4-styrene sulfonic acid, as well as sodium salts and ammonium salts of the foregoing sulfonic acids; polymerizable unsaturated monomers having a phosphoric acid group, such as 2-acryloyloxyethyl acid phosphate, 2-methacryloyloxy ethyl acid phosphate, 2-acryloyloxypropyl acid phosphate, 2-methacryloyloxy propyl acid phosphate and the like; polymerizable unsaturated monomers having an alkoxysilyl group, such as vinyltrimethoxysilane, vinyltriethoxysilane, vinyltris(2-methoxyethoxy)silane, γ-(meth)acryloyloxypropyltrimethoxysilane, γ-(meth)acryloyloxypropyltriethoxysilane and the like; perfluoroalkyl (meth)acrylates such as perfluorobutylethyl (meth)acrylate and perfluorooctylethyl (meth)acrylate; polymerizable unsaturated monomers having a fluorinated alkyl group, such as fluoroolefins; polymerizable unsaturated monomers having a photopolymerizable functional group such as a maleimide group; alkoxy (meth)acrylates such as methoxy (meth)acrylate, ethoxy (meth)acrylate, butoxy (meth)acrylate and the like; and polymerizable unsaturated monomers having two or more polymerizable unsaturated groups per molecule, such as allyl (meth)acrylate, ethylene glycol di(meth)acrylate, triethylene glycol di(meth)acrylate, tetraethylene glycol di(meth)acrylate, 1,3-butylene glycol di(meth)acrylate, tritrimethylolpropane tri(meth)acrylate, 1,4-butanediol di(meth)acrylate, neopentylglycol di(meth)acrylate, 1,6-hexanediol di(meth)acrylate, pentaerythritol di(meth)acrylate, pentaerythritol tetra(meth)acrylate, glycerol di(meth)acrylate, 1,1,1-trishydroxymethylethane di(meth)acrylate, 1,1,1-trishydroxymethyl ethane tri (meth)acrylate, 1,1,1-trishydroxymethylpropane tri(meth) acrylate, triallylisocyanurate, diallylterephthalate, divinylbenzene and the like. The foregoing can be used singly, or concomitantly as two or more types.

Polyalkylene glycol macromonomers are nonionic polymerizable unsaturated monomers represented by Formula (2) below. Concrete examples of such monomers include for instance polyethylene glycol (meth)acrylate, polypropylene glycol (meth)acrylate, methoxypolyethylene glycol (meth)acrylate, ethoxypolyethylene glycol (meth)acrylate and the like. Particularly preferred among the foregoing are polyethylene glycol (meth)acrylate and polypropylene glycol (meth)acrylate.

$$CH_2=C(R^1)COO(C_nH_{2n}O)_m-R^2 \qquad \text{Formula (2)}$$

(In the formula, $R^1$ represents a hydrogen atom or $CH_3$; $R^2$ represents a hydrogen atom or a C1-C4 alkyl group; m is an integer from 4 to 60, particularly from 4 to 55; and n is an integer from 2 to 3, such that m oxyalkylene units ($C_nH_{2n}O$) may be identical or mutually different.)

A preferred polymerizable unsaturated monomer (a3) having a functional group is herein in particular a polymerizable unsaturated monomer (a3-1) having at least one type of highly polar functional group selected from the group consisting of carboxyl groups, phosphoric acid groups, sulfonic acid groups, amino groups, quaternary bases, amide groups, hydroxyl groups, polyalkylene glycol groups and alkoxy groups.

By using a constituent component in the form of a polymerizable unsaturated monomer (a3-1) having a highly polar functional group, the acrylic resin (a) can have thus an appropriate number of highly polar functional groups in a side chain of the resin. A conceivable advantage of allowing an appropriate number of highly polar functional groups to be present in the side chain is the resulting enhanced dispersibility of the solid electrolyte and enhanced storage stability of the solid electrolyte dispersion paste, thanks to stronger adsorption forces that are elicited in such a case, given that when the highly polar functional groups are present only at the ends of the resin, adsorption between the solid electrolyte and the resin is point-like, whereas if the highly polar functional group is present at a plurality of side chains, the resin can come into contact with the solid electrolyte along lines or over surfaces.

The concentration of the highly polar functional group in the dispersion resin lies preferably in the range of 0.05 to 3.0 mmol/g, more preferably 0.1 to 2.0 mmol/g. When the concentration is higher than 3.0 mmol/g, resin polarity increases, and compatibility and/or solubility may be impaired as a result, whereas if the controlled is lower than 0.05 mmol/g, dispersibility and/or storage stability may be impaired.

The number of highly polar functional groups per molecule of the dispersion resin lies preferably in the range of 1 to 30, more preferably 3 to 20.

From the viewpoint of resin polarity, the acrylic resin (a) that can be used in the present invention preferably contains 1 to 30 mass % more preferably 1 to 25 mass %, and particularly preferably 1 to 15 mass %, of the polymerizable unsaturated monomer (a3-1), having a highly polar functional group.

If the content of the polymerizable unsaturated monomer (a3-1) having a highly polar functional group is high, the polarity of the acrylic resin (a) becomes excessively high, and accordingly solubility and compatibility with the solvent (C) and/or the binder (D) are poor. If on the other hand the content is too low, adsorption with the solid electrolyte is weaker, and dispersibility and storage stability become impaired as a result.

Adsorbing functional groups in the acrylic resin (a) may be neutralized by a basic compound or an acidic compound.

Examples of basic compounds used for neutralization include for instance hydroxides of alkali metals or alkaline-earth metals such as sodium hydroxide, potassium hydroxide, lithium hydroxide, calcium hydroxide, barium hydroxide and the like; ammonia; primary monoamine compounds such as ethylamine, propylamine, butylamine, benzylamine, monoethanolamine, neopentanolamine, 2-aminopropanol, 3-aminopropanol and the like; secondary monoamine compounds such as diethylamine, diethanolamine, di-n-propanolamine, di-iso-propanolamine, N-methylethanolamine, N-ethylethanolamine and the like; tertiary monoamine compounds such as dimethylethanolamine, trimethylamine, triethylamine, triisopropylamine, methyldiethanolamine, dimethylaminoethanol and the like; and polyamine compounds such as diethylenetriamine, hydroxyethylaminoethylamine, ethylaminoethylamine, methylaminopropylamine and the like. The foregoing may be used singly or in the form of combinations of two or more types.

Examples of acidic compounds that can be used for neutralization include for instance organic acids such as formic acid, acetic acid, propionic acid, succinic acid, glutaric acid, butyric acid, lactic acid, malic acid, citric acid, tartaric acid, malonic acid, adipic acid and the like; organic sulfonic acids such as sulfonic acid, paratoluene sulfonic acid, methanesulfonic acid and the like; and inorganic acids such as hydrochloric acid, sulfuric acid, nitric acid, orthophosphoric acid, polyphosphoric acid, polymetaphosphoric acid, orthophosphorous acid, boric acid, hydrofluoric acid and the like. The foregoing acids may be used singly or in combinations of two or more types.

The neutralization reaction may be conducted on monomers having adsorbing functional groups, or on the resin after polymerization.

In a case where the acrylic resin (a) thus obtained has an acid group, the acid value is 50 mgKOH/g or lower, and lies preferably in the range of 6 to 50 mgKOH/g; in a case where the acrylic resin (a) has an amino group, the amine value is 50 mgKOH/g or lower, and lies preferably in the range of 3 to 30 mgKOH/g; in a case where the acrylic resin (a) has a hydroxyl group, the hydroxyl value is 100 mgKOH/g or lower, and is preferably 50 mgKOH/g or lower.

A conventionally known method may be used as the polymerization method of the acrylic resin (a). For instance, the acrylic resin (a) may be produced through solution polymerization of the polymerizable unsaturated monomers in an organic solvent, but the method is not limited thereto, and may involve for instance bulk polymerization, emulsion polymerization, suspension polymerization or the like. Solution polymerization may involve continuous polymerization or batch polymerization, and the polymerizable unsaturated monomers may be charged all at once, or may be charged divisionally, or may be added continuously or intermittently.

A known initiator can be used as the radical polymerization initiator used for polymerization. Examples thereof include for instance peroxide-based polymerization initiators such as cyclohexanone peroxide, 3,3,5-trimethylcyclohexanone peroxide, methylcyclohexanone peroxide, 1,1-bis(tert-butylperoxy)-3,3,5-trimethylcyclohexane, 1,1-bis(tert-butylperoxy)cyclohexane, n-butyl-4,4-bis(tert-butylperoxy)

valerate, cumene hydroperoxide, 2,5-dimethylhexane-2,5-dihydroperoxide, 1,3-bis(tert-butylperoxy-m-isopropyl)benzene, 2,5-dimethyl-2,5-di(tert-butylperoxy)hexane, diisopropylbenzene peroxide, tert-butylcumyl peroxide, decanoyl peroxide, lauroyl peroxide, benzoyl peroxide, 2,4-dichlorobenzoyl peroxide, di-tert-amyl peroxide, bis(tert-butylcyclohexyl)peroxydicarbonate, tert-butylperoxybenzoate, 2,5-dimethyl-2,5-di(benzoylperoxy)hexane, tert-butylperoxy-2-ethylhexanoate and the like; and azo-based polymerization initiators such as 2,2'-azobis(isobutyronitrile), 1,1-azobis(cyclohexane-1-carbonitrile), azocumene, 2,2'-azobis(2-methylbutyronitrile), 2,2'-azobisdimethylvaleronitrile, 4,4'-azobis(4-cyanovalericacid), 2-(t-butylazo)-2-cyanopropane, 2,2'-azobis(2,4,4-trimethylpentane), 2,2'-azobis(2-methylpropane), dimethyl-2,2'-azobis(2-methylpropionate) and the like. The foregoing can be used singly, or concomitantly as two or more types.

The solvent used for the above polymerization or dilution is not particularly limited, and may be for instance water or an organic solvent, or a mixture thereof. Examples of the organic solvent include conventionally known solvents, for instance hydrocarbon solvents such as n-butane, n-hexane, n-heptane, n-octane, cyclopentane, cyclohexane, cyclobutane and the like; aromatic-based solvents such as toluene, xylene and the like; ether-based solvents such as n-butyl ether, dioxane, ethylene glycolmonomethyl ether, ethylene glycolmonoethyl ether, ethylene glycolmonobutyl ether, diethylene glycol and the like; ester-based solvents such as ethyl acetate, n-butyl acetate, isobutyl acetate, butyl butyrate, ethylene glycol monomethyl ether acetate, butyl carbitol acetate and the like; ketone-based solvents such as methyl ethyl ketone, methyl isobutyl ketone, diisobutyl ketone and the like; alcohol-based solvents such as ethanol, isopropanol, n-butanol, sec-butanol and isobutanol; and amide-based solvents such as Equamide (trade name, by Idemitsu Kosan Co., Ltd.), N,N-dimethylformamide, N,N-dimethylacetamide, N-methylformamide, N-methylacetamide, N-methylpropioamide, N-methyl-2-pyrrolidone and the like. The foregoing can be used singly, or concomitantly as two or more types. In a case where the solvent used for polymerization and/or dilution of the acrylic resin (a) is not removed in a solvent-removal step, the solvent becomes incorporated into the solid electrolyte dispersion paste of the present invention, and accordingly the solvent lies within the scope of the solvent (C) described below.

In solution polymerization within an organic solvent a method can be resorted to that involves mixing the polymerization initiator, a polymerizable unsaturated monomer component and the organic solvent, and heating the resulting mixture while under stirring, or a method which, in order to suppress rises in temperature in the system derived from reaction heat, involves charging the organic solvent into a reaction vessel, and dripping the polymerizable unsaturated monomer component and the polymerization initiator over a predetermined lapse of time, by mixed dripping or separate dripping, while under stirring at a temperature in the range of 60° C. to 200° C., and/or with concurrent blowing of an inert gas such as nitrogen or argon, as needed.

Polymerization can be conducted generally over about 1 to 10 hours. An additional catalyst step of heating the reaction vessel while under dripping of the polymerization initiator may be provided as needed, after polymerization in respective stages.

The weight-average molecular weight of the acrylic resin (a) thus obtained is 3,000 or higher, and lies preferably in the range of 3,000 to 100,000, more preferably 3,000 to 70,000 and particularly preferably 3,000 to 40,000.

In the present specification, the number-average molecular weight and weight-average molecular weight are values worked out by converting retention time (retention capacity) measured through gel permeation chromatography (GPC), in terms of the molecular weight of polystyrene according to the retention time (retention capacity) of standard polystyrene having a known molecular weight and measured under identical conditions. Specifically, the measurements can be carried out of under conditions of mobile phase: tetrahydrofuran, measurement temperature: 40° C., flow rate: 1 mL/min and detector RI, using "HLC8120GPC" (trade name, by Tosoh Corporation) as a gel permeation chromatograph, and using four columns "TSKgel G-4000HXL", "TSKgel G-3000HXL", "TSKgel G-2500HXL" and "TSKgel G-2000HXL" (trade names, all by Tosoh Corporation).

Sulfur Compound Solid Electrolyte (B)

A known sulfur compound solid electrolyte that can be used as the material of sulfide solid electrolytes in secondary batteries can be used, in the present invention, as the sulfur compound solid electrolyte (B). In the present invention the sulfur compound solid electrolyte is preferably obtained using a starting material composition that, contains $Li_2S$ and $P_2S_5$, given the high Li ion conductivity that these exhibit. In the present invention, the proportion of $Li_2S$ and $P_2S_5$ in the starting material composition lies preferably in the range $Li_2S:P_2S_5=70:30$ to $80:20$, in molar ratio.

More specific examples of such sulfur compound solid electrolytes include specifically for instance $Li_2S$—$SiS_2$, $LiI$—$Li_2S$—$SiS_2$, $LiI$—$Li_2S$—$P_2S_5$, $LiI$—$Li_2S$—$P_2O_5$, $LiI$—$Li_3PO_4$—$P_2S_5$, $Li_2S$—$P_2S_5$, $Li_3PS_4$ and the like. The foregoing sulfur compound solid electrolytes can be used singly or in mixture of two or more types.

Solvent (C)

The solvent (C) is not particularly limited, but ester-based solvents represented by Formula (1) below and/or hydrocarbon-based solvents are preferred in the present invention.

$$R^1COOR^2 \tag{1}$$

(In the formula, $R^1$ and $R^2$ may be identical or different, and each represents a hydrocarbon having 2 or more carbon atoms.)

In the formula (1), $R^1$ and $R^2$ may be identical or different. $R^1$ and $R^2$ each represent a hydrocarbon having 2 or more carbon atoms, preferably a hydrocarbon having 3 or more carbon atoms. $R^1$ and $R^2$ each preferably represent a hydrocarbon having 10 or less carbon atoms, more preferably a hydrocarbon having 7 or less carbon atoms, more preferably a hydrocarbon having 5 or less carbon atoms, although there is no upper limit on the number of carbon atoms of the hydrocarbon represented by $R^1$ and $R^2$. Examples of the hydrocarbon having 2 or more carbon atoms in Formula (1) include alkyl groups such as ethyl groups, propyl groups, isopropyl groups, butyl groups, sec-butyl groups, isobutyl groups, tert-butyl groups, hexyl groups, heptyl groups, octyl groups, cyclopentyl groups, cyclohexyl groups and the like, and aryl groups such as phenyl groups, tolyl groups, benzyl groups and the like.

Examples of the ester-based solvent represented by Formula (1) above include propyl propionate, butyl butyrate, propyl butyrate, butyl valerate, pentyl valerate, and ethyl benzoate.

Examples of hydrocarbon-based solvents include for instance toluene, xylene, heptane, trimethylbenzene, tetramethylbenzene, ethylbenzene, hexane, octane, nonane, decane and the like.

These solvents can be used singly or in the form of mixtures of two or more types.

In a case where a mixture of the ester-based solvent represented by Formula (1) and a hydrocarbon-based solvent is used as the solvent (C), the proportion of the foregoing is not particularly limited, but for instance the hydrocarbon-based solvent can be used ordinarily in an amount of 0.1 to 10000 parts by mass, preferably 5 to 5000 parts by mass, and more preferably 10 to 1000 parts by mass, with respect to 100 parts by mass of the ester-based solvent represented by Formula (1).

In the present invention, the solubility parameter of the solvent (C) is preferably 7.3 to 8.5 $(J/mol)^{1/2}$, from the viewpoint of combining dispersibility and suppression of electrolyte degradation.

The water content in the solvent (C) is preferably lower than 1%, more preferably lower than 0.8%, and particularly preferably lower than 0.4%, from the viewpoint of suppressing decomposition.

The water content in the present invention can be measured for instance in accordance with a Karl Fischer coulometric titration method. Specifically, the water content can be measured using a Karl Fischer moisture content meter (product name: MKC-610 by Kyoto Electronics Industry Co., Ltd.), with the set temperature of a moisture vaporizer (product name: ADP-611 by Kyoto Electronics Industry Co., Ltd.), provided in the device, being set to 130° C.

Binder (D)

The binder of the present invention is not particularly limited, and can be for instance an acrylic binder, a fluorine-containing binder such as polyvinylidene fluoride (PVDF) or polytetrafluoroethylene (PTFE), or a rubber binder such as a styrene-butadiene rubber (SBR), a butadiene rubber or the like. The rubber binder is not particularly limited, and for instance there is suitably used a hydrogenated butadiene rubber or a rubber resulting from introducing a functional group at the ends of a hydrogenated butadiene rubber.

Among the binders described above, a binder is preferably used in the present invention that is obtained through introduction of a functional group at the ends of a hydrogenated butadiene rubber. That is because higher adhesive performance is achieved when the binder has a functional group.

The weight-average molecular weight of the binder is not particularly limited, and lies in the range of 50,000 to 1,500,000, and preferably of 100,000 to 1,000,000, in particular of 100,000 to 800,000. A more practicable slurry can be achieved by prescribing the weight-average molecular weight of the binder to lie in the above ranges.

The weight-average molecular weight of the binder is measured by gel permeation chromatography (GPC), on a polystyrene standard basis.

Other Additives

The sulfur compound solid electrolyte dispersion paste for secondary batteries of the present invention may include components (which may be other additives) other than the above components (A), (B), (C) and (D). Examples of such other additives include for instance neutralizing agents, pigment dispersing agents, defoaming agents, preservatives, anti-rust agents, plasticizers, curing agents and the like.

Examples of the pigment dispersant include for instance resins other than the dispersion resin (A). More specifically, the pigment dispersant may be for instance a polyester resin, an epoxy resin, a polyether resin, an alkyd resin, a urethane resin, a silicone resin, a polycarbonate resin, a silicate resin, a chlorine-based resin, a fluorine-based resin, a polyvinylpyrrolidone resin, a polyvinyl alcohol resin, a polyvinylacetal resin and composite resins of the foregoing, other than the dispersion resin (A). These resins can be used singly, or concomitantly as two or more types.

The curing agent is not particularly limited so long as it can elicit a crosslinking reaction with the dispersion resin (A) and/or the binder (D), and may be specifically for instance a melamine resin or a polyisocyanate resin. The dispersion resin (A) and/or the binder (D) can be crosslinked through the action of the above curing agent.

Method for Producing a Sulfur Compound Solid Electrolyte Dispersion Paste for Secondary Batteries The sulfur compound solid electrolyte dispersion paste for secondary batteries of the present invention can be produced by mixing the dispersion resin (A), sulfur compound solid electrolyte (B), solvent (C)), and optionally the binder (D) and/or other components. Mixing of the above components can be accomplished through uniform mixing and dispersion using a conventionally known dispersing machine such as a paint shaker, a sand mill, a ball mill, a pebble mill, an LMZ mill, a DCP pearl mill, a planetary ball mill, a homogenizer, a twin screw kneader, a thin-film spin-type high speed mixer, an ultrasonic homogenizer or the like.

The mixing ratio of the dispersion resin (A) and the sulfur compound solid electrolyte (B) in the present invention is not particularly limited, and for instance the sulfur compound solid electrolyte (B) can be used in an amount of ordinarily 100 to 1000000 parts by mass, preferably 1000 to 100000 parts by mass and more preferably 1000 to 20000 parts by mass, with respect to 100 parts by mass of the dispersion resin (A). The use amount of the solvent (C) is not particularly limited, and for instance the solvent (C) can be used ordinarily in an amount of 50 to 500 parts by mass, preferably 60 to 400 parts by mass and more preferably 100 to 300 parts by mass, with respect to 100 parts by mass of the sulfur compound solid electrolyte (B). The compounding amount of the binder (D) in an embodiment where one such is used is not particularly limited, and for instance the binder (D) can be used ordinarily for instance in an amount of 0.1 to 10 parts by mass, preferably 0.2 to 8 parts by mass, and more preferably 0.2 to 4 parts by mass, with respect to 100 parts by mass of the sulfur compound solid electrolyte (B).

In an embodiment where the binder (D) is used, the dispersion resin (A), sulfur compound solid electrolyte (B), binder (D), and optionally other components may all be dispersed in the solvent (C), but in a preferred embodiment, the sulfur compound solid electrolyte dispersion paste for secondary batteries of the present invention can also be produced by dispersing the dispersion resin (A), the sulfur compound solid electrolyte (B) and optionally other components in the solvent (C), separately dispersing the binder (D) and optionally other components in the solvent (C), and mixing then the dispersion of the dispersion resin (A) and the sulfur compound solid electrolyte (B), and the dispersion of the binder (D).

2. Sulfur Compound Solid Electrolyte Dispersion Paste for Secondary Batteries

The present invention provides a sulfur compound solid electrolyte layer for secondary batteries, which is a dried product of the sulfur compound solid electrolyte dispersion paste for secondary batteries. The heat drying temperature is not particularly limited, but for instance can be set as appropriate to lie ordinarily in a range of room temperature to 250° C., preferably 50° C. to 220° C., more preferably 70° C. to 190° C.

In the present invention, a sulfur compound solid electrolyte layer for secondary batteries resulting from mixing the dispersion resin (A), the sulfur compound solid electrolyte (B) and optionally the binder (D) and/or other components may be used as the sulfur compound solid electrolyte layer for secondary batteries. Therefore, the present invention provides a sulfur compound solid electrolyte layer for secondary batteries that contains the dispersion resin (A), the sulfur compound solid electrolyte (B) and optionally the binder (D), wherein the dispersion resin (A) contains at least one type of acrylic resin (a) having a weight-average molecular weight of 3000 or higher. The specific examples, compounding proportions and so forth in this embodiment are identical to those described above.

3. All-Solid-State Secondary Battery

The present invention further provides an all-solid-state secondary battery that has the above sulfur compound solid electrolyte layer, and a positive electrode and a negative electrode. As the positive electrode and the negative electrode there can be used known electrodes in the technical field of all-solid-state secondary batteries. The all-solid-state secondary battery can be produced by resorting to a known method, as appropriate, but using herein the above-described sulfur compound solid electrolyte layer of the present invention, or starting components thereof.

EXAMPLES

The present invention will be further explained by way of examples and comparative examples.

Known methods in the relevant technical field are resorted to as the method for synthesizing the various resins, the methods for producing a paste, an electrolyte layer and a secondary battery, and as an evaluation test method.

However, the present invention is not limited thereto, and numerous various alterations and variations are encompassed within a scope equivalent to the technical idea and the scope of the claims of the present invention.

In all the examples the language "parts" denotes part by mass, and "%" denotes mass %.

Production of the Acrylic Resin (a)

Production Example 1

A reaction vessel equipped with a stirring heating apparatus and with a cooling pipe was charged with 30 parts of butyl butyrate, was purged with nitrogen, and thereafter the vessel was kept at 110° C. The monomer mixture below was dripped into the reaction vessel over 3 hours.

| Monomer Mixture | |
|---|---|
| n-butyl methacrylate | 39 parts |
| Isostearyl acrylate | 39 parts |
| Ethyl acrylate | 12 parts |
| 2-hydroxyethyl methacrylate | 10 parts |
| t-butylperoxy-2-ethylhexanoate | 1.2 parts |

After 1 hour since dripping was over, a solution of 0.5 parts of t-butylperoxy-2-ethylhexanoate in 10 parts of butyl butyrate was dripped into the reaction vessel over 1 hour. Once dripping was over, the reaction vessel was further held at 110° C. for 1 hour, and thereafter was adjusted with butyl butyrate, to yield a solution of an acrylic resin (a-1) having solids of 70%. The acrylic resin (a-1) had a weight-average molecular weight of 30,000.

Production Examples 2 to 12

Acrylic resins (a-2) to (a-12) were produced, with the same composition and in accordance with the same production method as in Production example 1, but varying the types, compounding amounts and production scheme in Table 1 below.

TABLE 1

| | | | Prod. Ex. 1 | Prod. Ex. 2 | Prod. Ex. 3 | Prod. Ex. 4 | Prod. Ex. 5 | Prod. Ex. 6 | Prod. Ex. 7 | Prod. Ex. 8 | Prod. Ex. 9 | Prod. Ex. 10 | Prod. Ex. 11 | Prod. Ex. 12 |
|---|---|---|---|---|---|---|---|---|---|---|---|---|---|---|
| | Acrylic resin name | | (a-1) | (a-2) | (a-3) | (a-4) | (a-5) | (a-6) | (a-7) | (a-8) | (a-9) | (a-10) | (a-11) | (a-12) |
| (a1) | nBMA | (SP: 8.25) | 39 | 4 | 51.5 | 25 | 25 | 39 | 39 | 39 | 39 | 39 | 39 | 39 |
| | ISA | (SP: 7.87) | 39 | 15 | 48 | 40 | 20 | 39 | 39 | 39 | 47 | 39 | 39 | 39 |
| (a2) | EA | (SP: 8.81) | 12 | 65 | 0 | 4 | 40 | 12 | 12 | 12 | 7 | 12 | 12 | 12 |
| (a3) | HEMA | (SP: 9.9) | 10 | 16 | | 31 | | | | | | | | |
| | DMAEMA | (SP: 10.6) | — | — | — | | | 10 | | | | | | |
| | AAc | (SP: 12.89) | — | — | 0.5 | | 15 | | 10 | | | | 10 | 10 |
| | MPEGMA | (SP: 10.6) | — | — | — | | | | | | 10 | 10 | | |
| | DMAA | (SP: 20.7) | | | | | | | | | | 7 | | |
| | MEA | (SP: 10.16) | | | | | | | | | | | | |
| | Initiator (PBO) amount | | 1.2 | 1.2 | 1.2 | 1.2 | 1.2 | 1.2 | 1.2 | 1.2 | 1.2 | 1.2 | 3.6 | 8 |
| | Reaction temperature (° C.) | | 110 | 110 | 110 | 110 | 110 | 110 | 110 | 110 | 110 | 110 | 110 | 140 |
| | Resin SP | | 8.3 | 8.8 | 8.1 | 8.6 | 9.1 | 8.4 | 8.6 | 8.6 | 8.98 | 8.6 | 8.6 | 8.6 |
| | Molecular weight (Mw) | | 30000 | 30000 | 30000 | 30000 | 30000 | 30000 | 30000 | 30000 | 30000 | 30000 | 17000 | 2500 |

The abbreviations in the table are as follows.
nBMA: n-butyl methacrylate
ISA: isostearyl acrylate
EA: ethyl acrylate
HEMA: 2-hydroxyethyl methacrylate
DMAEMA: dimethylaminoethyl methacrylate
AAc: acrylic acid
MPEGMA: methoxypolyethylene glycol methacrylate
DMAA: dimethyl acrylamide
MEA: 2-methoxyethyl acrylate
PBO: t-butylperoxy-2-ethylhexanoate Production of a Sulfur Compound Solid Electrolyte Dispersion Paste for Secondary Batteries Example 1

Respective pastes were produced by mixing the sulfide solid electrolyte, solvents, binder and dispersion resins in the amounts given in Table 2. More specifically, the above compounds were charged in a 45 mL zirconia pot, zirconia balls (Ø 1.0 mm) were likewise charged therein, and the pot was sealed completely. This pot was attached to a planetary ball mill (by Fritsch GmbH) and was processed at a table rotational speed of 300 rpm for 0.5 hours.

Examples 2 to 16, Comparative Examples 1 to 4

Pastes (X-2) to (X-20) were produced with the same composition and in accordance with the same production method as in Example 1 was produced, but with the formulations given in Table 2.

TABLE 2

| | | Examples/Comparative Examples Example | | | | | | | | | |
|---|---|---|---|---|---|---|---|---|---|---|---|
| | | 1 | 2 | 3 | 4 | 5 | 6 | 7 | 8 | 9 | 10 |
| | Paste name | (X-1) | (X-2) | (X-3) | (X-4) | (X-5) | (X-6) | (X-7) | (X-8) | (X-9) | (X-10) |
| Dispersion resin (A) | Acrylic resin (a-1) | 0.8 | | | | | | | | | |
| | Acrylic resin (a-2) | | 0.8 | | | | | | | | |
| | Acrylic resin (a-3) | | | 0.8 | | | | | | | |
| | Acrylic resin (a-4) | | | | 0.8 | | | | | | |
| | Acrylic resin (a-5) | | | | | 0.8 | | | | | |
| | Acrylic resin (a-6) | | | | | | 0.8 | | | | |
| | Acrylic resin (a-7) | | | | | | | 0.8 | | | |
| | Acrylic resin (a-8) | | | | | | | | 0.8 | | |
| | Acrylic resin (a-9) | | | | | | | | | 0.8 | |
| | Acrylic resin (a-10) | | | | | | | | | | 0.8 |
| | Acrylic resin (a-11) | | | | | | | | | | |
| | Acrylic resin (a-12) | | | | | | | | | | |
| | Polyester resin | | | | | | | | | | |
| Sulfur compound (B) | | 100 | 100 | 100 | 100 | 100 | 100 | 100 | 100 | 100 | 100 |
| Solvent (B) | Ethyl acetate (SP: 9.1) | | | | | | | | | | |
| | Butyl acetate (SP: 8.5) | | | | | | | | | | |
| | Butyl butyrate (SP: 8.1) | 150 | 150 | 150 | 150 | 150 | 150 | 150 | 150 | 150 | 150 |
| | Heptane (SP: 7.4) | | | | | | | | | | |
| Binder (D) | Butadiene rubber | 1 | 1 | 1 | 1 | 1 | 1 | 1 | 1 | 1 | 1 |
| Evaluation tests | Viscosity | B | C | B | C | C | B | B | B | B | B |
| | Storage test | A | A | A | A | A | A | A | A | A | A |
| | Conductivity | B | C | B | C | C | B | B | B | B | B |
| | Comprehensive evaluation | B | C | B | C | C | B | B | B | B | B |

| | | Examples/Comparative Examples | | | | | | | | | |
|---|---|---|---|---|---|---|---|---|---|---|---|
| | | Example | | | | | | Comparative Example | | | |
| | | 11 | 12 | 13 | 14 | 15 | 16 | 1 | 2 | 3 | 4 |
| | Paste name | (X-11) | (X-12) | (X-13) | (X-14) | (X-15) | (X-16) | (X-17) | (X-18) | (X-19) | (X-20) |
| Dispersion resin (A) | Acrylic resin (a-1) | | | | | | | | | | |
| | Acrylic resin (a-2) | | | | | | | | | | |
| | Acrylic resin (a-3) | | | | | | | | | | |
| | Acrylic resin (a-4) | | | | | | | | | | |
| | Acrylic resin (a-5) | | | | | | | | | | |
| | Acrylic resin (a-6) | | | | | | | | | | |
| | Acrylic resin (a-7) | | 2 | 11 | 0.8 | 0.8 | 0.8 | | | | |
| | Acrylic resin (a-8) | | | | | | | | | | |
| | Acrylic resin (a-9) | | | | | | | | | | |
| | Acrylic resin (a-10) | | | | | | | | | | |
| | Acrylic resin (a-11) | 0.8 | | | | | | | | | |
| | Acrylic resin (a-12) | | | | | | | | | | 0.8 |

TABLE 2-continued

|  |  | 1 | 2 | 3 | 4 | 5 | 6 | 7 | 8 | 9 | 10 |
|---|---|---|---|---|---|---|---|---|---|---|---|
|  | Polyester resin |  |  |  |  |  |  |  |  |  | 0.8 |
|  | Sulfur compound (B) | 100 | 100 | 100 | 100 | 100 | 100 | 100 | 100 | 100 | 100 |
| Solvent (B) | Ethyl acetate (SP: 9.1) |  |  |  |  |  | 150 |  |  |  |  |
|  | Butyl acetate (SP: 8.5) |  |  |  |  | 150 |  |  |  |  |  |
|  | Butyl butyrate (SP: 8.1) | 150 | 150 | 150 |  |  |  | 150 | 194 | 150 | 150 |
|  | Heptane (SP: 7.4) |  |  |  | 150 |  |  |  |  |  |  |
| Binder (D) | Butadiene rubber | 1 | 1 | 1 | 1 | 1 | 1 | 1 | 1 | 1 | 1 |
| Evaluation tests | Viscosity | B | A | A | B | B | B | E | B | D | E |
|  | Storage test | A | B | B | A | A | A | C | E | C | B |
|  | Conductivity | B | C | D | B | C | D | A | A | E | E |
|  | Comprehensive evaluation | B | B | D | B | C | D | E | E | E | E |

Evaluation Tests

Table 2 sets out the results (viscosity, storage and conductivity) of the evaluation tests described below. In the present invention it is important that excellent performance be exhibited in all three of viscosity, storage test and conductivity. If any of the foregoing is evaluated as non-acceptable "E", the relevant item is marked as non-acceptable (comprehensive evaluation "E").

Viscosity

In a viscosity measurement there were compared viscosities at a peripheral speed of 38.3 (1/s), using an E-viscometer (Toki Sangyo Co., Ltd., trade name: RE215). Evaluation rankings A, B, C and D are acceptable, whereas E is non-acceptable.

A: viscosity lower than 100 mPa·s.
B: viscosity from 100 mPa·s to less than 200 mPa·s.
C: viscosity from 200 mPa·s to less than 300 mPa·s.
D: viscosity from 300 mPa·s to less than 400 mPa·s.
E: viscosity of 400 mPa·s or higher.

Storage Test

Each paste obtained in the examples and the comparative examples was placed in a test tube, and was stored by being left to stand for 3 days at normal temperature. The evaluation involved working out a proportion of the height of a separation layer with respect to the height of a slurry as a whole. Evaluation rankings A, B, C and D are acceptable, whereas E is non-acceptable.

A: separation layer of less than 3%
B: separation layer from 3% to less than 10%
C: separation layer from 10% to less than 20%
D: separation layer from 20% to less than 30%
E: separation layer of 30% or more Conductivity Each paste was coated onto an Al foil by doctor blade application, to form a coating film, and the coating film was scraped off to yield a material out of which 0.1 g were pressed to produce a pellet. This pellet was subjected to an impedance measurement using an impedance measuring device (trade name: 1287/1255B by Solartron Analytical), to determine the resistance of the pellet. Evaluation rankings A, B, C and D are acceptable, whereas E is non-acceptable.

A: resistance lower than 30Ω; very good conductivity
B: resistance from 30Ω to less than 35Ω; good conductivity
C: resistance from 35Ω to less than 40Ω; somewhat poor conductivity
D: resistance from 40Ω to less than 45Ω; somewhat poor conductivity
E: resistance of 45Ω or higher; very poor conductivity

The invention claimed is:

1. A sulfur compound solid electrolyte dispersion paste for secondary batteries, containing a dispersion resin (A), a sulfur compound solid electrolyte (B) and a solvent (C),
   wherein the dispersion resin (A) contains at least one acrylic resin (a) having a weight-average molecular weight of 3000 or higher, and
   wherein the acrylic resin (a) contains, as a polymerizable unsaturated monomer (a3) having a functional group, a high-polarity polymerizable unsaturated monomer (a3-1) having at least one highly polar functional group selected from the group consisting of carboxyl groups, phosphoric acid groups, sulfonic acid groups, amino groups, quaternary bases, amide groups, hydroxyl groups, polyalkylene glycol groups and alkoxy groups.

2. The sulfur compound solid electrolyte dispersion paste for secondary batteries according to claim 1, containing 0.01 to 10 mass % of the dispersion resin (A) with respect to the solids mass of the sulfur compound solid electrolyte dispersion paste.

3. The sulfur compound solid electrolyte dispersion paste for secondary batteries according to claim 1, wherein the acrylic resin (a) is a copolymer of starting monomers including 20 to 99 mass % of a polymerizable unsaturated monomer (a1) having an alkyl group with 4 or more carbon atoms, 0 to 50 mass % of a polymerizable unsaturated monomer (a2) having an alkyl group with fewer than 4 carbon atoms, and 1 to 30 mass % of the polymerizable unsaturated monomer (a3) having a functional group.

4. The sulfur compound solid electrolyte dispersion paste for secondary batteries according to claim 1, wherein the acrylic resin (a) further contains a high-polarity polymerizable unsaturated monomer (a2-1) having a solubility parameter of 9 $(J/mol)^{1/2}$ or higher, as a polymerizable unsaturated monomer (a2) having an alkyl group with fewer than 4 carbon atoms.

5. The sulfur compound solid electrolyte dispersion paste for secondary batteries according to claim 1, wherein a solubility parameter of the acrylic resin (a) is lower than 9 $(J/mol)^{1/2}$.

6. The sulfur compound solid electrolyte dispersion paste for secondary batteries according to claim 1, wherein the solvent (C) is an ester-based solvent represented by Formula (1) below, and/or a hydrocarbon-based solvent:

$$R^1COOR^2 \tag{1}$$

wherein $R^1$ and $R^2$ may be identical or different, and each represents a hydrocarbon having 2 or more carbon atoms.

7. The sulfur compound solid electrolyte dispersion paste for secondary batteries according to claim 1, wherein a solubility parameter of the solvent (C) is 7.3 to 8.5 $(J/mol)^{1/2}$.

8. The sulfur compound solid electrolyte dispersion paste for secondary batteries according to claim 1, further containing a binder (D).

9. A sulfur compound solid electrolyte layer for secondary batteries, which is a dried product of the sulfur compound solid electrolyte dispersion paste for secondary batteries according to claim 1.

10. A sulfur compound solid electrolyte layer for secondary batteries, containing a dispersion resin (A), a sulfur compound solid electrolyte (B), and optionally a binder (D),
   wherein the dispersion resin (A) contains at least one type of acrylic resin (a) having a weight-average molecular weight of 3000 or higher, and
   wherein the acrylic resin (a) contains, as a polymerizable unsaturated monomer (a3) having a functional group, a high-polarity polymerizable unsaturated monomer (a3-1) having at least one highly polar functional group selected from the group consisting of carboxyl groups, phosphoric acid groups, sulfonic acid groups, amino groups, quaternary bases, amide groups, hydroxyl groups, polyalkylene glycol groups and alkoxy groups.

11. An all-solid-state secondary battery, comprising the sulfur compound solid electrolyte layer according to claim 9, a positive electrode and a negative electrode.

* * * * *